United States Patent
Smit

(10) Patent No.: US 6,824,371 B2
(45) Date of Patent: Nov. 30, 2004

(54) INSULATION PLUG FOR UNDERWATER PELLETIZER DIE FACE RECESS

(75) Inventor: Jim Smit, Grand Rapids, MI (US)

(73) Assignee: Gala Industries, Inc., Eagle Rock, VA (US)

( * ) Notice: Subject to any disclaimer, the term of this patent is extended or adjusted under 35 U.S.C. 154(b) by 33 days.

(21) Appl. No.: 09/919,919

(22) Filed: Aug. 2, 2001

(65) Prior Publication Data

US 2003/0031742 A1 Feb. 13, 2003

(51) Int. Cl.[7] .................................................. B29B 9/06
(52) U.S. Cl. ........................ 425/67; 425/311; 425/313; 425/464; 425/DIG. 230
(58) Field of Search ................... 425/67, 313, 464, 425/382 R, DIG. 30, 308, 311, 310

(56) References Cited

U.S. PATENT DOCUMENTS

| | | | |
|---|---|---|---|
| 4,123,207 A | 10/1978 | Dudley | 425/67 |
| 4,251,198 A | 2/1981 | Altenburg | 425/67 |
| 4,500,271 A | 2/1985 | Smith | 425/67 |
| 4,621,996 A | 11/1986 | Hundley, III | 425/190 |
| 4,728,276 A | 3/1988 | Pauley et al. | 425/67 |
| 5,059,103 A | 10/1991 | Bruckmann et al. | 425/67 |
| 5,403,176 A | 4/1995 | Bruckmann et al. | 425/464 |
| 5,593,702 A * | 1/1997 | Harris et al. | 425/67 |
| 5,611,983 A * | 3/1997 | Ma et al. | 264/142 |
| 5,624,688 A | 4/1997 | Adams et al. | 425/67 |
| 5,989,009 A * | 11/1999 | Matsuo | 425/464 |

OTHER PUBLICATIONS

Drawing (undated) illustrating insulation material and cover place prior art described in specification, p. 2, line 13—p. 3, line 4.

\* cited by examiner

*Primary Examiner*—Robert Davis
*Assistant Examiner*—Joseph S. Del Sole
(74) *Attorney, Agent, or Firm*—Jacobson Holman PLLC

(57) ABSTRACT

An insulation plug is disclosed for mounting in and generally filling a central recess in the die face of an extrusion die in an underwater pelletizer. The insulation plug is in the form of a rigid circular plate that substantially fills the recess in the die face oriented in opposed relation to a cutter hub and cutter knives of the underwater pelletizer and is secured in place by a fastening bolt. The insulation plug may be made of solid one piece construction or hollow two piece construction, but is made of a material having low heat conductivity. The plug has raised and recessed portions to form bottom and side air gaps within the recess. The plug reduces the transfer of heat from the molten polymer being extruded through orifices in the die plate to water circulating through a water box of the underwater pelletizer. A rigid bushing or spacer may be used in existing extrusion die plates to maintain the bottom air gap against compressive forces generated by the fastening bolt when attaching the circular plate.

14 Claims, 4 Drawing Sheets

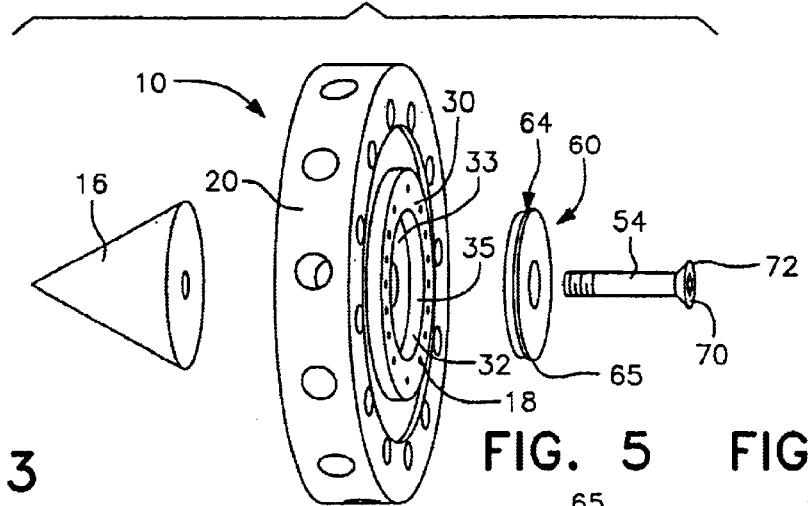
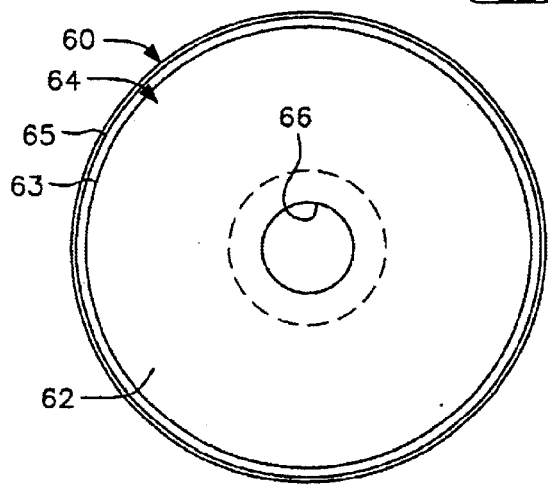
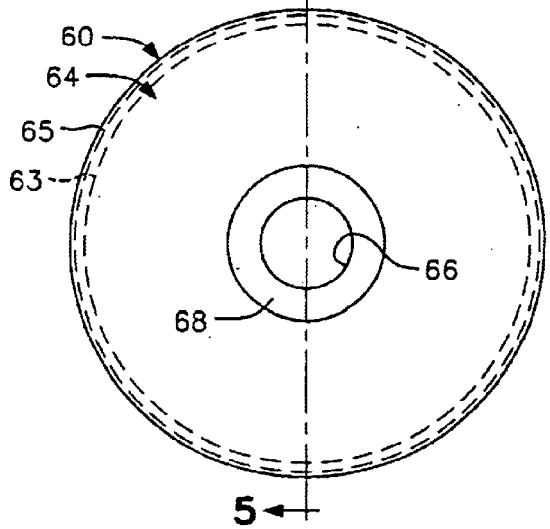
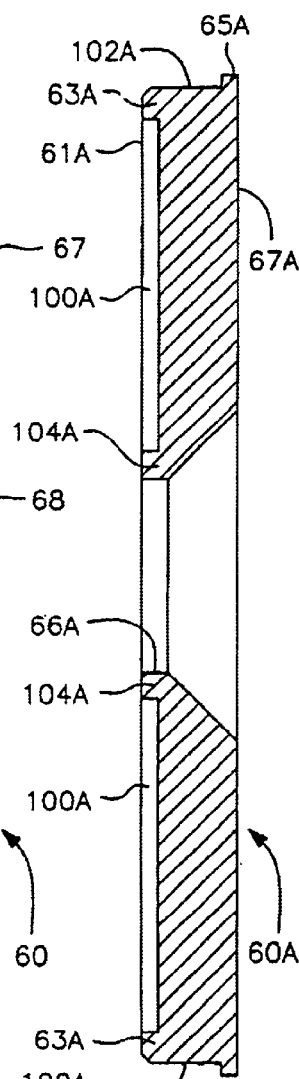
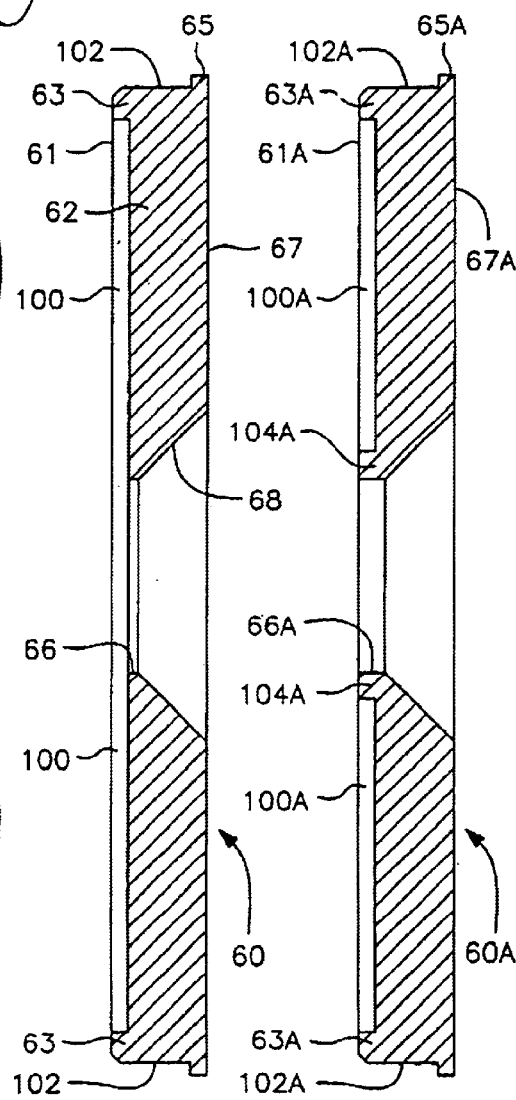

INSULATION PLUG FOR UNDERWATER PELLETIZER DIE FACE RECESS

BACKGROUND OF THE INVENTION

1. Field of the Invention

The present invention generally relates to underwater pelletizers and, more specifically, to an insulation plug mounted in and generally filling the recess in the die face of an extrusion die in an underwater pelletizer.

2. Description of the Prior Art

Known underwater pelletizers include an extrusion die having extrusion orifices extending therethrough, and through which molten polymer is extruded. A cutter hub with cutter knives is oriented in rotatable facing relationship to the face of the extrusion die to cut the strands of polymer into pellets. A water box with a water inlet and outlet provides circulation of water to cool and solidify the strands of extruded polymer to enable the knives on the cutter hub to cut the strands into pellets. The water circulating through the water box also entrains the pellets into a slurry of water and pellets which are discharged from the water box.

It is the present practice to provide a recess in the die face of the extrusion die and place insulation material in the recess to reduce heat transfer from the extrusion die and molten polymer being extruded through the extrusion orifices to the water circulating through the water box. The insulation material inserted into the recess is typically a gasket material mounted in place by a suitable mastic, glue or the like and covered with a thin metal plate in the recess. The thin plate is secured to the die by suitable fasteners to maintain the insulation material in place in the recess. The insulation material is subjected to substantial degradation due to the temperatures encountered in the recess and, in some instances, does not effectively insulate the central recess area of the die face. Ineffective insulation can result in excessive cooling of the molten polymer as it is being extruded through the extrusion orifices causing freeze off of the molten polymer at the die face.

The following U.S. patents, owned by the Assignee of this application, relate to underwater pelletizers and illustrate the relationship between the extrusion die, cutter hub and knives, water box with the water inlet and water and pellet slurry outlet:

| | | |
|---|---|---|
| 4,123,207 | 4,621,996 | 5,403,176 |
| 4,251,198 | 4,728,276 | 5,624,688 |
| 4,500,271 | 5,059,103 | |

SUMMARY OF THE INVENTION

In order to overcome the known problems associated with the insulation techniques of the prior art, the present invention provides an insulation plug in the form of a circular plate that substantially fills the recess in the die face of the extrusion die of an underwater pelletizer. The plate is of unitary construction and has a diameter substantially equal to the diameter, and a thickness substantially the same as the depth, of the recess in the die face. The circular plate reduces the transfer of heat from the molten polymer being extruded through the orifices in the extrusion die to the water circulating through the water box of the underwater pelletizer, but is not subject to deterioration and degradation as encountered with prior art insulation techniques.

The plate can be a solid one piece construction or a hollow two piece construction and should be made of a material having a low heat conductivity. Extrusion dies are typically made of carbon steel and the die body can be either solid or hollow (cavity type construction). Hollow die bodies can serve to provide a passageway for heating or cooling mediums, or simply for weight reduction or insulation purposes. The circular plate of the present invention is preferably made from stainless steel or low heat conductive ceramic materials, although other low heat conductive materials could be used. In the hollow plate construction, other high insulating materials could be placed in the hollow space.

The insulation plug formed by the circular plate of the present invention includes a raised boss around the periphery of the face (inner) of the plate adjacent the bottom of the recess in the extrusion die face. Hence, when the insulation plug is inserted into the extrusion die recess, a thin bottom air gap or space is formed between the adjacent insulation plug inner face and the bottom of the recess. As such, air is entrapped in this thin bottom air gap or space to enhance the insulating characteristics of the insulation plug with respect to heat transmitted from the bottom of the recess of the extrusion die.

The circular insulation plug of the present invention also includes a flange around the top of the cylindrical side wall of the circular plate to form a peripheral recess extending around the plate from the inner face of the plate (adjacent the bottom of the recess in the extrusion die) toward the opposite face (outer). The flange is sized to sealingly engage with the top inner peripheral surface of the recess in the extrusion die face. This sealing engagement of the flange with the periphery of the recess in the extrusion die and the peripheral recess in the side wall of the plate form a thin side air gap or space which entraps air between the side of the recess and the insulation plug and enhances the insulating characteristics of the insulation plug with respect to heat transfer from the side of the extrusion die recess. In addition, the peripheral flange around the periphery of the plate accommodates any variations in the dimensions of the recess in the extrusion die and the plate during their manufacture.

The insulation plug also includes a central opening with an inclined peripheral edge increasing in diameter toward the outer face of the insulation plug which is adjacent the cutter hub and cutter knives. The central opening in the plate receives an attaching or fastening bolt having a correspondingly configured bolt head. The bolt extends through the insulation plug and into a threaded bore in the extrusion die, or nose cone on the upstream side of the extrusion die, to secure the insulation plug in place in the recess in the die face of the extrusion die.

In certain embodiments of the present invention, the insulation plug includes a second raised boss on the inner face of the plate around the periphery of the attaching bolt opening which bears against the bottom surface of the recess to maintain the spacing for the bottom air gap against any compressive forces generated by the bolt attaching the insulation plug to the die plate or nose cone. In an alternate embodiment, an annular bushing or spacer can be placed in the countersunk bore of an existing die plate. The bottom, or one end, of the bushing bears against the bottom surface of the counterbore and the top, or other end, of the bushing bears against the inner face of the circular plate around the attaching bolt opening. The bushing thus serves to maintain the spacing for the bottom air gap against any compressive forces generated by the attaching bolt.

It is, therefore, an object of the present invention to provide a rigid insulation plug in the form of a circular plate for insertion into and retention in a correspondingly configured recess in the die face of an extrusion die of an underwater pelletizer.

A further object of the present invention is to provide an insulation plug in accordance with the preceding object and which will reduce heat transfer from the molten polymer and extrusion die of an underwater pelletizer to water circulating through the water box associated with the cutter hub, cutter knives and die face.

Another object of the present invention is to provide an heat insulation plug of low heat conductive material which can be solid or hollow and readily secured in the recess of the die face of the extrusion die of an underwater pelletizer for permanent insulation.

Yet a further object of the present invention is to provide a permanent heat insulation plug in accordance with the preceding objects in which the dimensional characteristics of the insulation plug are substantially the same as the dimensional characteristics of the recess to enable the insulation plug to closely fit into and substantially fill the recess in the die face of the extrusion die of an underwater pelletizer.

Yet another object of the present invention is to provide a heat insulation plug formed by a circular plate which includes a boss around the outside periphery of the inner surface, or face directed toward the bottom of the extrusion die recess, to form a narrow gap or space therebetween to entrap air between the adjacent faces of the recess bottom and insulation plug to enhance the insulating characteristics of the insulation plug.

A still further object of the present invention is to provide a heat insulation plug which includes a peripheral flange around the side wall top edge which is sized to sealingly engage with the top inner peripheral surface of the recess in the extrusion die to form a peripheral recess around the cylindrical lower side of the plug. This sealing engagement entraps air in the side recess to further enhance the insulating characteristics of the insulation plug. The peripheral recess also minimizes surface contact with the side wall of the extrusion die recess to accommodate for variations in the dimensions of the extrusion die recess.

Still another object of the present invention is to provide an insulation plug in accordance with the preceding objects in which the insulation plug is constructed of a low heat conductive material so as to improve the heat insulating properties of the insulation plug.

A still further object of the invention is to provide an insulation plug in accordance with the preceding objects in which the attaching bolt has a head that is recessed into the opening through the insulation plug in order to provide a substantially planar surface on the insulation plug, bolt head and die face.

One further object of the present invention is to provide an insulation plug in accordance with the preceding objects and which further includes structure around the attaching bolt opening on the inner face of the plate which prevents the central portion of the plate from deflecting inwardly when the attaching bolt is threaded into the die body or nose cone and maintains the spacing of the bottom air gap.

Yet another object of this invention to be specifically enumerated herein is to provide a heat insulation plug for the die face recess of an underwater pelletizer extrusion die in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is an exploded group perspective view illustrating the extrusion die, nose cone and an insulation plug of the present invention.

FIG. 3 is an elevational view of the insulation plug of FIG. 1 looking at the surface which is oriented against the inner surface of the recess in the extrusion die.

FIG. 4 is an elevational view of the insulation plug of FIG. 1 looking at the surface which faces the cutter hub of the underwater pelletizer.

FIG. 5 is a vertical sectional view, on an enlarged scale, taken along section line 5—5 on FIG. 4 illustrating the solid structure of the insulation plug of FIG. 1, the configuration of the bolt receiving hole in the center of the plug and the peripheral recess in the inner face of the plug adjacent the bottom of the recess in the die face.

FIG. 6 is a vertical sectional view, on an enlarged scale, similar to FIG. 5, illustrating the structure of the insulation plug of FIG. 1A.

DESCRIPTION OF THE PREFERRED EMBODIMENT

Figure 1:
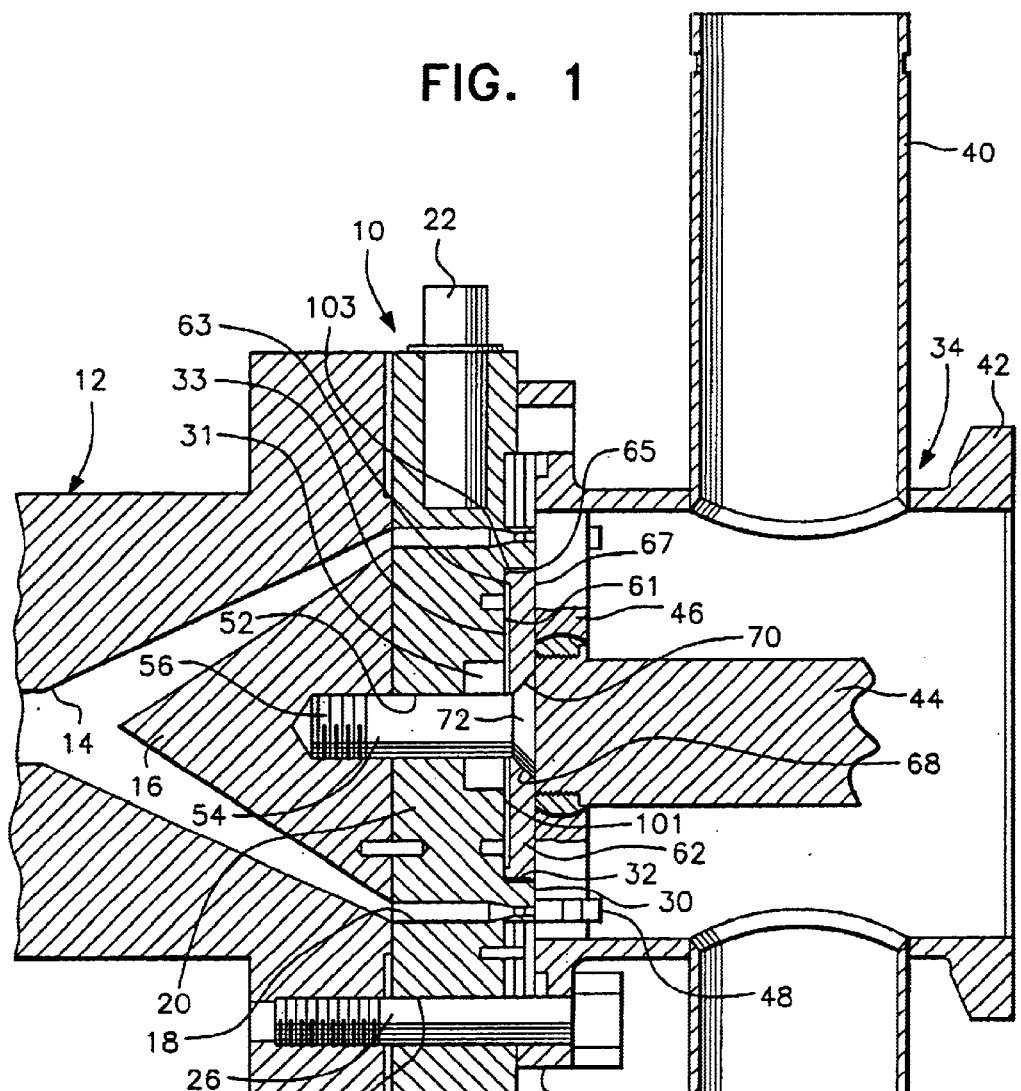
FIG. 1 is a partial sectional view of an underwater pelletizer illustrating an insulation plug of the present invention mounted in the recess in the die face of an existing extrusion die plate.

Although several preferred embodiments of the invention are explained in detail, it is to be understood that the invention is not limited in its scope to the details of construction and arrangement of components set forth in the following description or illustrated in the drawings. The invention is capable of other embodiments and of being practiced or carried out in various ways. Also, in describing the preferred embodiments, specific terminology will be resorted to for the sake of clarity. It is to be understood that each specific term includes all technical equivalents which operate in a similar manner to accomplish a similar purpose.

FIG. 1 of the drawings illustrates an underwater pelletizer including a conventional extrusion die, generally designated by reference numeral 10, mounted on a housing, generally designated by reference numeral 12, of an extruder. The housing 12 includes an inlet passageway 14 receiving molten polymer from upstream equipment. The molten polymer is diverted outwardly by a nose cone 16 and passes through a plurality of extrusion orifices 18 in the extrusion die 10. The extrusion die 10 is in the form of a die plate 20 having radial heating elements 22 extending inwardly from the periphery thereof and a plurality of apertures 24 receiving bolts 26 which are threaded into threaded apertures 28 in housing 12. The die plate 20 includes a die face 30 on the downstream side. The die face 30 includes a central circular recess 32 inwardly of orifices 18. The die plate 20 also includes a countersunk bore 31 in the die face 30 to accommodate the head of a socket head screw which would normally be used to hold the nose cone 16 in place on existing extrusion dies.

A water box, generally designated by reference numeral 34, in the form of a hollow housing includes a flange 36 secured to the extrusion die 10 and housing 12 by the bolts 26. The water box 34 includes a water inlet 38, a water and pellet slurry outlet 40 and a flange 42 associated with a similar flange on a drive unit (not shown). A drive shaft 44 extends through water box 34 and supports a cutter hub 46 and a plurality of cutter knives 48 associated with the die face 30 to cut polymer strands extruded through the orifices 18 into pellets. Water circulating through the water box cools and solidifies the polymer and entrains the pellets into a water and pellet slurry for discharge through outlet 40. The central circular recess 32 in die face 30 includes a through bolt hole 52 therein through which a bolt 54 extends. The bolt 54 is threaded into an internally threaded bore 56 in the nose cone 16. All of the above-mentioned structure is conventional and well known and functions in a well known manner to extrude molten polymer through extrusion holes or orifices 18 in the die plate 20.

The present invention is an insulation plug generally designated by reference numeral 60. The insulation plug 60 is in the form of a cylindrical plate 62 positioned in and substantially completely filling the recess 32. The insulation plug 60 includes an outer or upper face 67 directed towards the cutter hub and cutter blades and an inner or bottom face 61 which faces towards the bottom 33 of the recess 32 of the extrusion die plate 20. The insulation plug 60 also includes a cylindrical peripheral edge, generally designated by reference numeral 64, fitting closely within the recess 32. The bottom or inner face 61 of the plate 62 includes a boss 63 around its outer periphery to form a raised ring thereon. The raised ring creates a narrow recess 100 on the inner face 61 inside the boss 63, which defines a thin bottom air gap 101 with bottom surface 33. Hence, when the cylindrical plate 62 is positioned in the extrusion die plate recess 32, the bottom air gap 101 entraps air between the inner face 61 and bottom 33 of recess 32. The entrapped air serves to assist the insulation plug 60 in preventing heat transfer from the extrusion die adjacent recess bottom 31 into the insulation plug 60.

The peripheral edge 64 of plate 62 also includes a flange 65 extending around the edge 64 adjacent the outer face 67 to form a peripheral recess 102 extending from the inner face 61 to the adjacent edge of flange 65. The flange 65 is sized to engage with the inner peripheral surface 35 of the recess 32 in the extrusion die plate 20. When the plate 62 is positioned in the recess 32, the flange 65 and recess 102 form a thin peripheral or side air gap or space 103. The side air gap or space 103 entraps air to retard heat flow to the plug 60 from the periphery 35 of the recess 32, and enhances the insulating characteristics of the insulation plug 60. The peripheral edge of recess 102 is preferably chamfered as at 69 in order to provide a smooth transition from face 61 to recess 102.

The peripheral recess 102 in the peripheral edge 64 of the plate 62 also minimizes surface contact with recess wall 33 in order to allow for variations in the dimensions of the recess wall 33 in the extrusion die plate 20. In addition, the plate 62 preferably has a thickness substantially equal to the depth of the recess 32 so that the exposed surface of the plate 62 when inserted into the recess 32 will be substantially flush with and planar with respect to the downstream surface of the die face 30, as shown in FIG. 1.

The mounting bolt 54 extends through a central opening 66 in the insulation plug 60, through the hole 52 in die plate 20 and is threaded into the nose cone 16 for anchoring the insulation plug 60 in place. The opening 66 is provided with a tapering surface 68 as illustrated in FIG. 5 corresponding to the taper 70 on the head 72 of the bolt 54. Thus, when the bolt 54 is inserted through the opening 66 in the insulation plug 60, the bolt head 72 will sealingly engage the tapering surface 68 and be flush with the surface (face) 67 of die plate 20 and the die face 30.

Figure 1A:
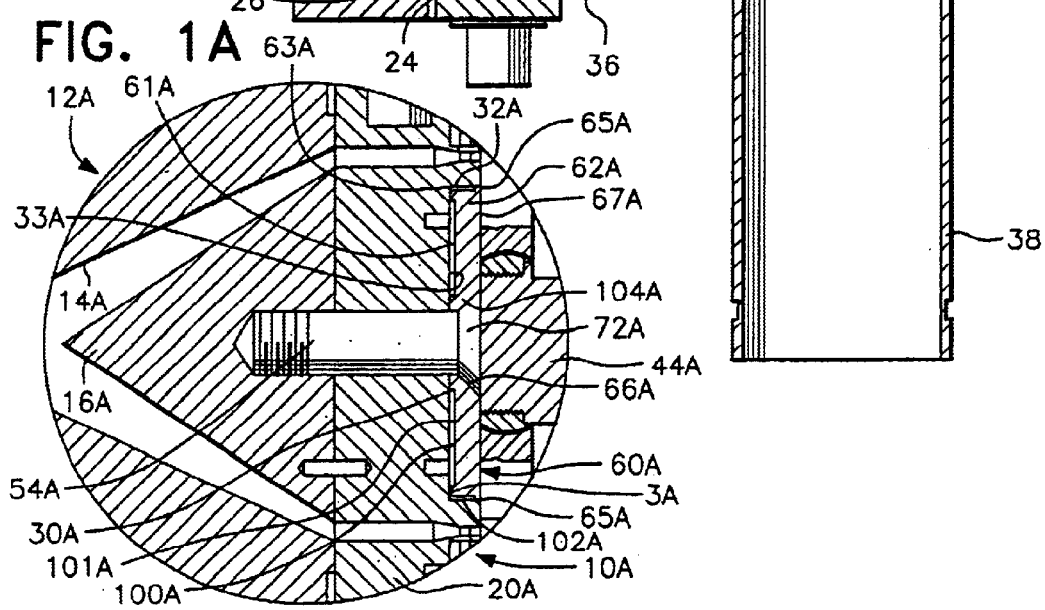
FIG. 1A is a partial sectional view of an underwater pelletizer illustrating an insulation plug of the present invention mounted in the recess in the die face of an extrusion die plate which does not include a countersunk bore to accommodate the head of a socket head screw to hold the nose cone to the opposite side of the die plate.

Turning now to FIGS. 1A and 6, the numbers correspond to those used in FIGS. 1-5 for the same respective component, except the letter "A" follows the number. FIG. 1A illustrates a conventional extrusion die, generally designated by reference 10A with an extrusion die plate 20A. However, the extrusion die plate 20A shown in FIG. 1A does not include a countersunk bore in the die face 30A, as may be found in existing die plates 20, identified by reference numeral 31 in FIG. 1. The recess 32A in die face 30A receives an insulation plug, generally designated by reference numeral 60A, in accordance with the present invention. As shown by comparing FIG. 6 to FIG. 5, the insulation plug 60A is substantially identical to insulation plug 60, except the former includes a boss 104A around the inside periphery of surface 61A to form a raised ring adjacent opening 66A to abut the bottom surface 33A of the recess 32A. A thin or narrow recess 100A is thus formed between bosses 63A and 104A in the FIG. 6 embodiment.

Figure 7:
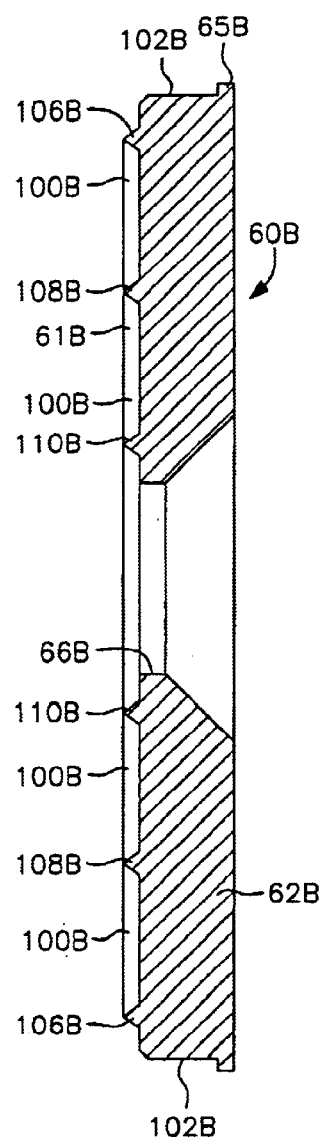
FIG. 7 is a vertical sectional view, on an enlarged scale, similar to FIG. 5, illustrating another embodiment of a solid insulation plug in accordance with the present invention.

Turning to the embodiment illustrated in FIG. 7, like numerals are used to indicate like parts of the insulation plug as previously described, but the letter "B" has been added to the numerals for the embodiment illustrated in this figure. FIG. 7 shows another embodiment of an insulation plug, generally designated by reference numeral 60B, in accordance with the present invention. Insulation plug 60B differs from insulation plug 60 and 60A by reason of the raised portions on the inner or bottom surface 61B to form the insulation gap 100B between the inner surface 61B and the bottom surface of an extrusion die plate recess (not shown in FIG. 7). The solid plate 62B includes three V-shaped bosses 106B, 108B and 110B to form raised concentric rings around the inner surface 61B to form a pair of insulation recess 100B. The bosses 106B, 108B and 110B operate in the same way as bosses 63A and 104A of the FIG. 6 embodiment, but the former make line contact with the recess bottom surface due to the V-shape of the bosses 106B, 108B and 110B.

Figure 8:
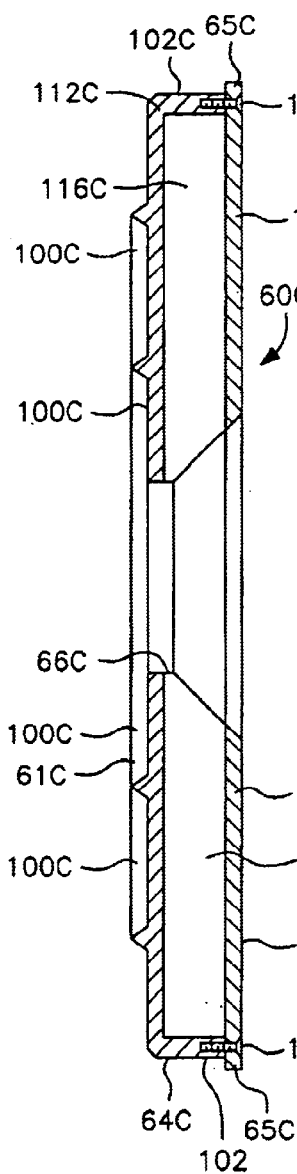
FIG. 8 is a vertical sectional view, on an enlarged scale, similar to FIG. 5, illustrating still another embodiment of the insulation plug of the present invention having a two piece hollow construction.

FIG. 8 illustrates another embodiment, generally designated by reference numeral GOC, of a rigid hollow insulation plug in accordance with the present invention. Again, the numbers correspond to the prior numbers to indicate like parts, except the letter "IC" has been added. In the FIG. 8 embodiment, the circular plate 62C is made up of two components, a lower open dish-shaped component 112C and a flat disk-shaped component 114C. The outer diameter of the disk 114C is slightly larger than the outer periphery 64C of the open dish 112C. Thus, when assembled, by appropriate screws 115C, or similar fasteners, the outer periphery of disk 114C forms the outer flange 65C. When assembled, a hollow space or opening 116C is formed between the inner surface of disk 114C and the opposed inner surface of dish 112C. Raised on the bottom surface 61C of the circular plate 62C are two V-shaped bosses which form concentric rings for engagement with the bottom surface of the extrusion die plate recess in forming the narrow space or gaps 100C. Also, the flange 65C cooperates with the periphery 64C of dish 112C to form the recess gap 102C.

Figure 9:
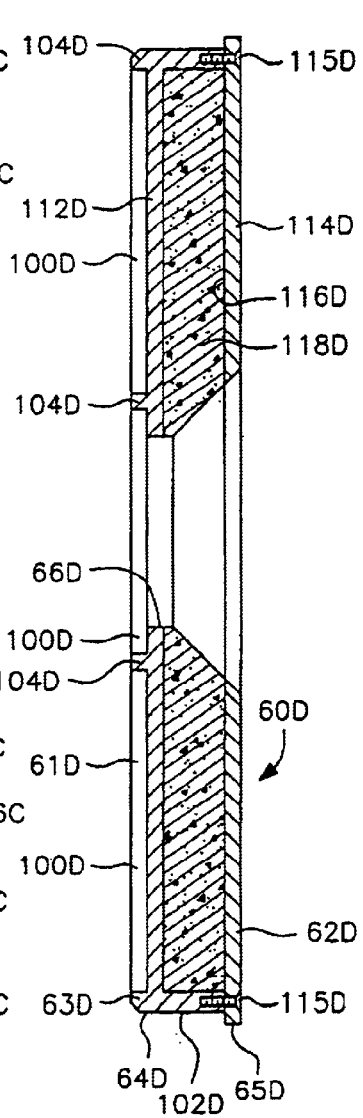
FIG. 9 is a vertical sectional view, on an enlarged scale, similar to FIG. 5, illustrating yet another embodiment of the insulation plug of the present invention having a two piece construction, in which the otherwise open central area is filled with insulation.

The embodiment illustrated in FIG. 9, with like numerals illustrating like parts with the added letter "D", shows an insulation plug, generally illustrated by reference numeral 60D. This embodiment includes a rigid two piece plate 62D construction with a lower dish-shaped open component 112D and a flat disk-shaped component 114D fastened together. The opening 116D, however, is filled with suitable insulation 118D, instead of being open as in the FIG. 8 embodiment. The bottom or inner surface 61D includes rectangular bosses 63D and 104D, similar to the bosses 63A and 104A shown in the FIG. 6 embodiment. In the FIG. 9 embodiment, however the boss 104D is spaced away from the opening 66D toward the periphery of the plate 62D. The bosses 63D and 104D form recess gaps 100D.

Figure 10:
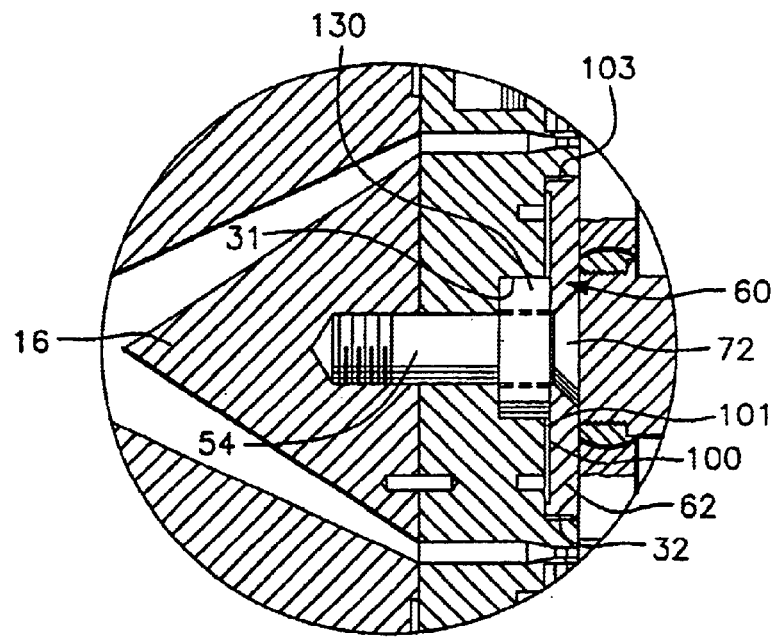
FIG. 10 is a partial sectional view similar to FIG. 1A, illustrating an insulation plug of the present invention mounted in the recess of the die face of an existing extrusion die plate, as shown in FIG. 1, but showing a bushing or spacer positioned in the counterbore to maintain the bottom air gap against any compressive forces generated by the fastening bolt when attaching to the nose cone.
Figure 11:
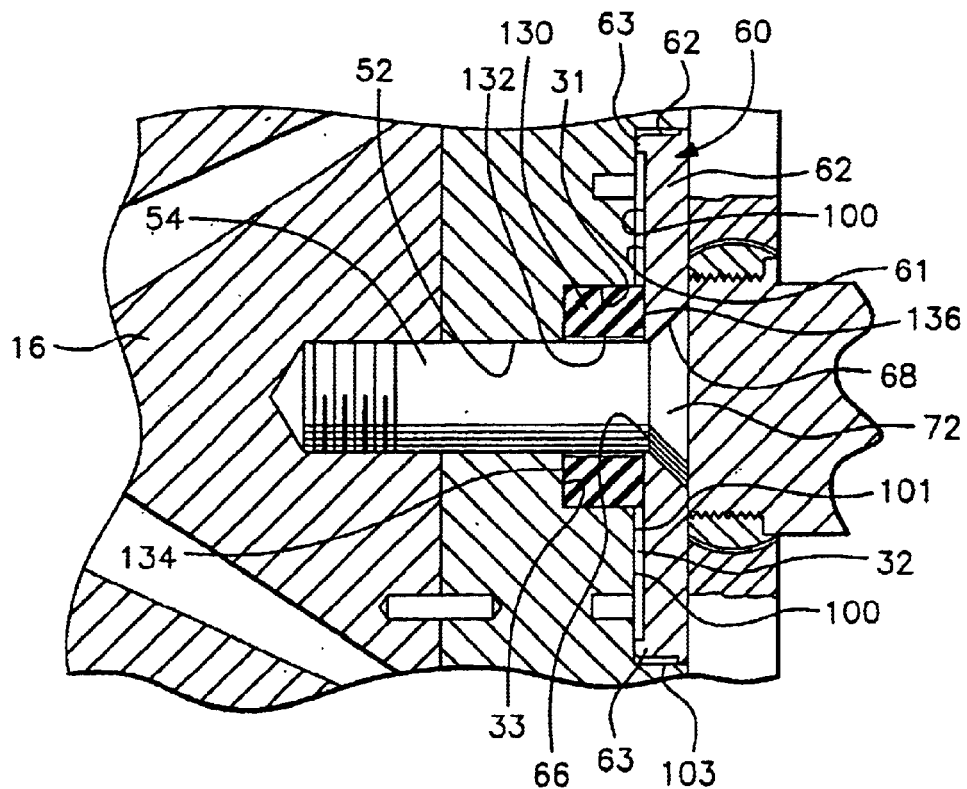
FIG. 11 is a partial sectional view, on an enlarged scale, of the structure shown in FIG. 10.

Lastly, FIGS. 10 and 11 show the insulation plug 60 mounted in the central recess 32 of the die plate 20 of an existing extrusion die plate 20 having a countersunk bore 31 as illustrated and previously discussed in connection with FIG. 1. Hence, the numerals in FIGS. 10 and 11 correspond to those used in connection with FIGS. 1 and 2–5. Instead of an open countersunk bore 31 as illustrated in FIG. 1, the embodiment of the present invention illustrated in FIGS. 10 and 11 includes a rigid annular bushing or spacer 130 positioned within the bore 31. The annular bushing has a central bore 132 through which the mounting bolt 54 extends when threaded into the nose cone 16. While the inner surface of bore 132 is shown spaced slightly away from the outer surface of bolt 54, a gap is unnecessary so long as the bolt 54 moves freely through the bore 132 of the rigid bushing or spacer 130. The outer surface of the bushing 130 is sized to fit neatly within the counterbore 31.

The bushing 130 includes a bottom surface 134 at one end which bears against the bottom surface 33 of the counterbore 31, and an upper surface 136 at the other end which bears upon the inner face 61 of the circular plate 62. The upper surface 136 of the bushing 130 is thus positioned to bear against the inner face 61 around the periphery of opening 66 of the insulation plug 60. Thus, if compressive forces are exerted at the center of the insulation plug 60 as the tapered head 72 sealingly engages the tapering surface 68 of the opening 66, the rigid bushing or spacer 130 serves to prevent the central portion of the plate 62 from deflecting inwardly and thus maintains the integrity of the bottom air gap 101.

As shown by the various embodiments, the rigid circular plate of the present invention can be a solid one piece construction or a hollow two piece construction. Other constructions are also possible. The solid form could be made up of two or more connected pieces. The hollow form could be made of multiple pieces and with multiple open compartments.

The circular plate should be made of a material having a low heat conductivity. Stainless steel or low heat conductive ceramic materials are preferred, although other low heat conductive materials which exhibit the necessary resistance for use in an underwater pelletizer might be considered appropriate. In the hollow construction shown in FIG. 9, the insulation material 118D can be insulation material which improves the heat transfer resistance of the circular plate and is not adversely affected by the aqueous solutions used in underwater pelletizers.

In accordance with this invention, a single rigid plate is secured in the recess 32 in close fitting relation to reduce the transfer of heat from the extrusion die 10 and molten polymer passing therethrough to the cooling water circulating through the water box 34 of the underwater pelletizer. The size of the bosses and flanges shown in the drawing figures of the insulation plugs of the present invention have been slightly exaggerated for illustration purposes. In a typical insulation plug 60, as shown in FIG. 5, having a diameter of approximately 3½ inches and a thickness almost ½ inch, the bearing surfaces of the boss 63 and flange 65 are approximately ⅛ inch, and the depth of the recesses 100 and 102 are approximately 0.005 inch–0.010 inch.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. An insulation plug for the die face of an extrusion die in an underwater pelletizer in which the die face is provided with a recess, said insulation plug including a rigid plate inserted into said recess in close fitting relationship thereto, said plate having at least one raised portion to form an air gap with said recess to reduce transfer of heat from the extrusion die and molten polymer being extruded therethrough into circulating water in said underwater pelletizer.

2. The insulation plug as defined in claim 1, wherein said plate is a solid one piece construction.

3. The insulation plug as defined in claim 1, wherein said rigid plate is made of a low heat conductive material.

4. The insulation plug as defined in claim 1, wherein said plate is circular with a central aperture, and including a retaining bolt extending through the aperture and into the extrusion die to secure said plate in said recess.

5. The insulation plug as defined in claim 4, wherein said aperture includes an inclined peripheral wall for engagement by an inclined peripheral wall on a head of said retaining bolt.

6. In combination, an extrusion die for an underwater pelletizer, said extrusion die including a die face having a recess therein, a rigid insulating plate fitting closely in said recess and substantially completely filling the recess to prevent water circulating in the pelletizer from coming into heat exchange relation to the surface of the die plate recess, said plate having at least one raised portion to define at least one air gap with said recess.

7. The combination as defined in claim 6, wherein said insulating rigid plate is made of a low heat conductive material which can withstand degradation by pellets and water.

8. The combination as defined in claim 6, wherein said recess has a bottom surface and a peripheral surface and said plate has an inner surface facing said recess bottom surface and a generally cylindrical side surface facing said recess peripheral surface and said raised portion being on said plate inner surface to engage said recess bottom surface.

9. The combination as defined in claim 8, wherein said generally cylindrical plate side surface also includes a raised portion in the form of a flange which engages said recess peripheral surface to define a second air gap in said recess.

10. An underwater pelletizer which comprises an extrusion die in the form of a die plate having a die face provided with a central circular recess and orifices around its periphery through which molten polymer is extruded from said die face, said recess having a bottom surface and a generally cylindrical peripheral surface, a cutter hub supporting a plurality of cutter knives which cooperate with said die face to cut polymer strands extruded through said orifices into pellets, and a water box surrounding said cutter hub, cutter knives and die face to cool said extruded polymer and transport said polymer pellets away from said die face, and a rigid insulation plug generally filling said die face central recess and having an inner surface in contact with at least a portion of said recess bottom surface and having a generally cylindrical side wall surface in contact with at least a portion of said recess peripheral surface to reduce transfer of heat from the extrusion die and molten polymer being extruded therethrough into said circulating water in said water box.

11. The underwater pelletizer as defined in claim 10, wherein said insulation plug is a plate having generally parallel opposed surfaces, a raised flange formed on said side wall surface adjacent the face of the rigid plate that faces toward the cutter hub and knives to form a peripheral recess on said side wall surface adjacent the face of the solid plate facing the bottom of the recess in the die plate, said flange engaging said inner peripheral surface of the recess in the die plate thereby entrapping air between the recess in the solid plate and the insulation plug to enhance the insulating characteristics of the insulation plug.

12. The underwater pelletizer as defined in claim 10, wherein said plug inner surface includes at least one raised portion thereon to form an air gap between said inner surface and said recess bottom surface to entrap air therebetween and enhance the insulating characteristics of the insulation plug.

13. The underwater pelletizer as defined in claim 10, wherein said rigid insulation plug is a solid one piece construction made of a material having low heat conductivity.

14. The underwater pelletizer as defined in claim 10, wherein said insulation plug is a plate having substantially parallel opposed surfaces with a raised flange on one said parallel opposed surface adjacent an outer periphery thereof to form an air gap between said one opposed plate surface and said bottom surface of said central recess.

* * * * *